United States Patent Office 3,809,745
Patented May 7, 1974

3,809,745
PROCESS FOR THE ENTRAPMENT AND
RECOVERY OF $SO_2$ GAS
Harold W. Wilson, El Paso, Tex., assignor to Golden Cycle Corporation, Colorado Springs, Colo.
No Drawing. Continuation of application Ser. No. 885,612, Dec. 16, 1969, which is a continuation-in-part of application Ser. No. 777,503, Nov. 20, 1968. This application Mar. 10, 1972, Ser. No. 233,785
Int. Cl. B01j 9/04, 9/08, 9/12; C01b 17/00
U.S. Cl. 423—244        9 Claims

ABSTRACT OF THE DISCLOSURE

Waste stack gases or other gases containing sulfur dioxide gas are passed into a system initially containing 90 to 95% of finely divided metallic oxides and metallic silicates, intimately admixed with an additive comprising not less than 3% or more than 5% water, not less than 2% or more than 5% dissolved alkali hydroxide such as sodium hydroxide or sodium metasilicate and between .01% to 0.1% stannous chloride or stannous hydroxide, all of the above noted percentages being based on parts by weight of each noted ingredient present in every 100 parts by weight of the slag containing system. The system is strongly agitated during the time the waste stack gas is being passed therethrough. The sulfur dioxide constituent of the stack gas is entrapped in the slag system and can be liberated therefrom in essentially pure form by subsequent heat treatment of the entrapment system. The system can thereupon be reused repeatedly for entrapment of further $SO_2$ gas because it is essentially regeneratable due to the addition of the additives noted above which prevent undue oxidation of the components of the system.

---

This is a continuation-in-part of application Ser. No. 885,612, filed Dec. 16, 1969, which application was a continuation-in-part of application Ser. No. 777,503, filed Nov. 20, 1968, now abandoned.

The present invention relates to the utilization of sulfur dioxide and acidic sulfur dioxide containing gases, for instance such as emitted as waste and air pollutants, commonly referred to as "waste stack gases," for example as during the processing of sulfide ores and in the burning of sulfur containing coals. More particularly, the present invention relates to a process for the entrapment of sulfur dioxide gas in waste stack gases by the utilization of a combination of mixed metallic oxides and metallic silicates. More specifically, the present invention relates to a dry process for the separation or recovery of sulfur dioxide from sulfur dioxide and acidic sulfur dioxide containing waste stack gases and whereby the sulfur dioxide recovered may be utilized as such, converted into elemental sulfur or converted into sulfuric acid. Such a dry process for use in the entrapment of sulfur dioxide contained by waste gases such as those emitted in the burning of sulfur containing fuel and from the smelting of pyritic type ores was disclosed in application Ser. No. 777,503, filed Nov. 20, 1968, now abandoned. In this previously disclosed process it was proposed that these or similar type waste gases or any gaseous matter containing sulfur dioxide be passed into finely divided solid matter consisting of a combination of metallic oxide and metallic silicates which additionally was made to contain physically combined water in an amount ranging between 2 to 7% by weight of the mixture to be processed.

As a preferred embodiment of that process it was proposed to use pulverized slag obtained as a waste from the reverberatory refining of copper pyritic ores as being highly suitable as the oxide metallic silicate containing material for the use in the entrapment of sulfur dioxide gases from gases containing such. Such waste slags are identified by the following typical analysis:

32%–38% silicon dioxide, present as mixed silicates of iron, calcium, magnesium, and aluminum
28%–32% iron, present predominantly as ferrous oxide and ferrous silicates
8%–10% calcium oxide, present as silicate
6%–8% aluminum oxide, present as silicate
.1%–.5% copper, present as metal and oxide
0–.5% lead, present as metal
0–1% sulfur, present in sulfide form.

It was further proposed that after the slag-water combination had been exposed to gases containing sulfur dioxide the resultant solid product could be freed of its content of sulfur dioxide by being subjected to heat treatment to result in the recovery of such sulfur dioxide as well as in the recovery of a reusable solid residue for recycling in the same process.

This invention constitutes an improvement over the advance of the state of the art disclosed in the above-mentioned disclosure of a dry process for the entrapment and recovery of sulfur dioxide gas.

Amongst the objects of this invention are the following:

The stabilization of the condition of the sulfite ions present as a result of the reaction of sulfur dioxide and water in the slag system being processed.

The suppression of hydrogen ion concentration.

The promotion of the formation of acid sulfite ions ($HSO_3^-$).

The promotion of the reaction of said acid sulfite ions with metallic oxides particularly ferrous oxide (FeO).

The acceleration of the rate of reactions of the said acid sulfite ions with metallic oxides particularly ferrous oxide.

The acceleration of the rate of the reaction producing metallic acid sulfite particularly the ferrous acid sulfite —$Fe(HSO_3)_2$.

The release of the water originally reacted with sulfur dioxide so that it may further react with sulfur dioxide entering the system.

The temporary retardation of the acid hydrolysis of the silicates of iron and aluminum thus minimizing base consuming metasilicic acid formation which is the product of acid hydrolysis of the acid reactable metallic silicates present in the slag in addition to the oxidic components.

The prevention or minimization of sulfite sulfur oxidation to sulfate through the agency of any of the atmospheric oxygen which may be present in the system thus enabling more complete stripping of the sulfur context.

The inhibition of the oxidation of the ferrous ion in the slag to form ferric iron thus enhancing the degree of reusability of the processed slag.

Further objects and aspects of the present invention will become apparent from the following more detailed description of the invention.

The foregoing objects and advantages and other benefits have been unexpectedly obtained by incorporating as an additive into the dry pulverized slag as described in application Ser. No. 777,503, filed Nov. 20, 1968, now abandoned, sufficient amounts of aqueous alkali hydroxide solution or aqueous solution of a hydrated alkali silicate such as for example sodium metasilicate ($Na_2SiO_3 \cdot 9H_2O$) or sodium orthosilicate ($Na_4SiO_4$) the same solution additionally containing dissolved stannite ions ($SnO_2^=$) such that the pulverized slag prior to being exposed to $SO_2$ gas or to mixtures of gases containing $SO_2$ is made to contain not less than three percent or more than five percent water, not less than two percent nor more than five percent dissolved alkali hydroxide such as sodium hydroxide (NaOH) or sodium metasilicate ($Na_2SiO_3 \cdot 9H_2O$) and stannous chloride or stannous oxide ($SnCl_2$ or $SnO$) in the range of 0.01% to 0.1% dissolved in the aqueous alkali hydroxide or silicate solution. The above noted percentages are based on parts by weight of each noted ingredient present in every one-hundred parts by weight of slag containing the named ingredients for example: 90 parts by weight of dry, pulverized slag are intimately combined with 10 parts by weight of an aqueous solution of sodium metasilicate. The solution itself is composed of 50 parts by weight of $Na_2SiO_3 \cdot 9H_2O$, 0.1 parts by weight of $SnCl_2$ and the balance water sufficient in amount to result in a solution of 100 parts by weight. The passage of sulfur dioxide containing gas into the system initiates a number of complex reactions. It appears that the presence of alkali ions such as $Na^+$ and $K^+$ peptizes the slag system and permits some base exchange reactions to take place between such alkali ions and the aluminum calcium and magnesium ions of the silicates of these metals present in the slag. Such base exchange appears to facilitate hydrolysis and reactions with sulfurous acid. After the initial metallic oxide-acid sulfite (($FeO-HSO_3^-$)) reactions are well underway and acid hydrolysis reactions are taking place, hydrated sodium orthosilicate ($Na_4 \cdot SiO_4 xH_2O$) is produced instead of the rapid formation of large quantities of metasilicic acid ($H_2SiO_3$) (as occurs in the absence of alkali hydroxide) where such metasilicic acid formation causes subsequent formation of undesirable sulfite ions ($SO_3^=$). The beneficial results of this process are due to the presence of the noted amounts of alkali hydroxide or sodium metasilicate, which participate in the reactions as illustrated in the following equations below:

1. $CaSiO_3 + 4NaOH \rightarrow Na_4SiO_4 + Ca(OH)_2 + H_2O$
2. $Al_2SiO_5 + 5NaOH \rightarrow Na_4SiO_4 + Al(OH)_3 + NaAlO_2 + H_2O$ Additionally the presence of the alkali hydroxide or alkali silicate in slag systems exposed to sulfur dioxide gas in the presence of limited amounts of water inhibits formation of sulfite ion as the result of the initial reaction of such hydroxide with the primary ionization products of the sulfurous acid formed from the combination of the sulfur dioxide with the water of the system as shown in the following equations:

3. $SO_2 + H_2O \rightleftharpoons H_2SO_3 \rightleftharpoons H^+ + HSO_3^-$
4. $H^+HSO_3^- + NaOH \rightarrow NaHSO_3 + H_2O$
5. $2(H^+ + HSO_3^-) + Na_2SiO_2 \cdot 9H_2O \rightarrow 2NaHSO_3 + H_4SiO_4 + 8H_2O$ The strongly acidic sodium acid sulfite and water produced in turn react with metallic oxides as shown below with ferrous oxide:

6. $1NaHSO_3 + H_2O + FeO \rightarrow Fe(HSO_3)_2 + 2NaOH$

The ferrous acid sulfite is formed as a transitory product at the operational temperatures of the system (stack gas systems range in temperatures between 225° F. to 275° F.) and becomes converted into ferrous sulfite as shown in the equation below:

7. $Fe(HSO_3)_2 \xrightarrow{250°F.} FeSO_3 + H_2O + SO_2$

The sodium (alkali) hydroxide formed (Equation 6 above) in turn reacts with the water and sulfur dioxide as derives in the conversion of the ferrous acid sulfite (Equation 7 above) to form additional sodium acid sulfite (as in Eqquation 4 above) which then reacts with additional metallic oxide (as in Equation 6 above). This cyclical reaction finally effects exhaustion of all of the reactable content of ferrous oxide as well as the contents of reactable calcium, magnesium, and other oxidic substances present in the slag under processing after which the alkali hydroxide itself is converted into sodium sulfite as shown in Equations 8 and 9 below:

8. $NaOH + H_2SO_3 \rightarrow NaHSO_3 + H_2O$
9. $2NaHSO_3 \rightarrow Na_2SO_3 + SO_2 + H_2O$ During this time some of the acid reactable silicates, predominantly the iron and aluminum silicates present in the slag, are undergoing acid hydrolysis to form both acidic and basic sulfite salts as illustrated below in Equations 10 and 11.

10. $FeSiO_3 + 2H_2SO_3 \rightarrow Fe(HSO_3)_2 + H_2SiO_3$
11. $Al_2SiO_5 + 3H_2O + SO_2 \rightarrow Al_2(CH)_4SO_3 + H_2SiO_3$ The ferrous acid sulfite $Fe(HSO_3)_2$ is converted into ferrous sulfite $FeSO_3$ as shown in Equation 12 while the basic aluminum sulfite remains as such 12. $Fe(HSO_3)_2 \rightarrow FeSO_3 + SO_2 + H_2O$ The sulfite salts of iron, calcium, and magnesium (being capable of hydration) are also able to form the so-called acid sulfito-salts (eg. $FeSO_3 \cdot H_2SO_3$) which contain absorbed $SO_2$ as illustrated in Equation 13..

13. $FeSO_3 + H_2O + SO_2 \rightarrow FeSO_3 \cdot H_2SO_3$

Such salts wherein the hydrogen of the acid has been replaced by alkali metals such as sodium are also readily formed in this process from the heavy metal sulfites produced by double decomposition of heavy metal hydrated oxides (e.g. $FeO \cdot H_2O$) with alkali sulfite to form the so-called "double sulfito salts" as shown in Equation 14.

14. $FeO \cdot H_2O + H_2SO_3 + Na_2SO_3 \rightarrow FeSO_3 \cdot Na_2SO_3 + H_2O$ The presence of alkali hydroxide and alkali silicates in this system yields results which exceed in importance even the enhancement of reaction rates and formation of metallic sulfite salts which are unexpectedly obtained by the inclusion of these additives into the slag system. A further unexpected advantage of the use of the above described additives is what appears to be synergistic oxidation-inhibiting effect brought about by the combined presence of alkali hydroxide and alkali stannite on the slag-water-$SO_2$ systems in suppressing the degree of oxidation of both the sulfite sulfur and the ferrous iron present. Some atmospheric oxygen will be entrained in the virgin slag (as a consequence of its pulverization in the presence of atmospheric air). Additional atmospheric oxygen will be present in the waste gases containing the sulfur dioxide. Similarly, oxygen or oxygenated matter such as sulfuric acid may or may not be present in the waste gases used, and water vapor or steam capable of promoting oxidation are certain to be present. It is proposed to introduced aqueous alkali hydroxide or aqueous hydrated alkali silicate solutions containing stannite ion into the slag prior to initially exposing the said slag to $SO_2$ gas or gases containing $SO_2$. The result is that the formation of either sulfate sulfur or ferric iron can be held to a minimum and in some cases may be completely prevented.

It is known that stannous chloride is a very strong reducing agent. It has unexpectedly been observed that when it is present in very minute amounts it also acts as a negative catalyst and additionally appears to poison positive catalysts in systems containing sulfite sulfur thus preventing such sulfite sulfur from being oxidized to sulfate form by atmospheric oxygen. However, experimental studies in connection with this invention indicate that unless the hydrogen ion concentration of slag systems exposed to $SO_2$ treatment is kept to a minimum as is achieved by the use of alkali hydroxide or alkali silicate as proposed in this improved process that when $SO_2$ gases containing even trace amounts of sulfate sulfur (e.g., $H_2SO_4$) and a content of as little as 2% atmospheric oxygen are injected into water-wetted slags (3%–5% by weight of slags), the presence of stannous chloride in amounts as large as 5% by weight is insufficient to prevent a considerable degree of oxidation of both ferrous iron and sulfite sulfur. In contrast, additional experimental studies were conducted identical in every respect to the above noted studies except that the slag before exposure to the same type of $SO_2$ gas system, was first mixed with the additive system of the present invention, including alkali hydroxide amounting to 5% NaOH by weight of the slags used and stannous chloride ($SnCl_2$) amounting to approximately 0.1% by weight of slag-water-NaOH system. The resultant products after $SO_2$ gassing showed the presence of only trace amounts of ferric iron and sulfur contents well below 1% as sulfate ($SO_4^=$) sulfur. Based upon these studies and others it appears that this improvement makes possible the conditions necessary for inhibiting oxidation of either ferrous iron of the slag to form ferric iron or of the sulfite sulfur (resulting from $SO_2$ gassing of such slag) to form sulfate sulfur where the formation of such oxidized products would be most undesirable from the standpoints of both chemistry and of economics since the degree of re-usability of the processed slag would be greatly reduced as likewise would its ability to be stripped of its sulfur content if such existed as sulfate instead of as sulfite sulfur. It appears furthermore that in addition to inhibiting the oxidation of ferrous iron and sulfite sulfur the use of the alkali hydroxide or alkali silicate ingredients in the slag inhibits the autoxidation of ferrous iron to ferric iron which in turn would promote formation of sulfate sulfur. Theoretically autoxidation of ferrous iron is brought about by the hydroxyl groups of water being attacked as shown below by the hydrated oxide of ferrous iron:

15. $$FeO + H_2O \rightleftharpoons Fe(OH)_2$$

16. $$Fe^{++} + 2\ OH^- + H \cdot OH \rightarrow Fe(OH)_3 + H^+$$

The free hydrogen made available combines with oxygen as shown in equation 17 to form hydrogen peroxide:

17. $$2H^+ + O_2 \rightarrow H_2O_2$$

In turn the hydrogen peroxide reacts with ferrous oxide to further the oxidation reaction as illustrated in Equation 18.

18. $$2\ FeO + H_2O_2 \rightarrow Fe_2O_3 + H_2O$$

The water formed immediately hydrates the ferric oxide which reacts with the sulfur dioxide and with the hydrogen peroxide to form unwanted ferric sulfate as shown in Equations 19, 20 and 21 below.

19. $$Fe_2O_3 + 3H_2O \rightarrow 2Fe(OH)_3$$

20. $$3SO_2 + 3H_2O_2 \rightarrow 3H_2SO_4$$

21. $$2Fe(OH)_3 + 3H_2SO_4 \rightarrow Fe_2(SO_4)_3 + 3H_2O$$

Once this cycle is initiated and accelerated oxidation-reduction reactions occur in a slag-water-$SO_2$ system containing no free alkali, the capacities for reuse of final products stripped of their $SO_2$ contents are greatly reduced, whereas in this new process requiring the presence of alkali this phenomena of autoxidation is greatly reduced rendering products that after $SO_2$ stripping not only have minimum amounts of oxidized entities, but still contain alkali hydroxide and stannite tin to permit their re-exposure to additional $SO_2$ for its optimum capability for the continued entrapment of $SO_2$ gas.

Further unexpected benefits accruing from incorporation of alkali hydroxide and alkali silicate in the $SO_2$ entrapment systems of this improved process are found in the results obtained from the secondary reaction taking place between the alkali hydroxide with water, $SO_2$ and the acid reactable silicate compounds present in the slag (e.g., MACHINE 25 $FeSiO_3$). The sodium acid sulfite and water (as illustrated in Equation 8) react with the metallic silicates as shown below to produce hydrated alkali silicate (in place of metasilicic acid as is the case in absence of alkali hydroxide).

22. $$2NaHSO_3 + H_2O + FeSiO_3 \rightarrow Fe(HSO_3)_2 + Na_2SiO_3 \cdot H_2O$$

The strong basic character of the alkali silicate as shown below

23. $$Na_2SiO_3 \cdot H_2O \rightleftharpoons H_2SiO_3 + 2NaOH$$

favors its immediate reaction as quickly as it is formed with sulfur dioxide entering the systems to form additional alkali acid sulfite as shown below with metasilicic acid absorbing $SO_2$ in the process.

24. $$(H_2SiO_3 + 2NaOH) + 3SO_2 \rightarrow 2NaHSO_3 + H_2SiO_3 \cdot SO_2$$

The alkali acid sulfite reacts with additional metallic silicate as shown in Equation 22 while the alkali hydroxide derived as shown in Equation 23 reacts with the metasilicic acid-adsorbed $SO_2$ to form additional sodium acid sulfite (as shown below) with the cycle continuing until complete conversion of acid reactable metallic silicates present into their respective metallic sulfite salts takes place.

25. $$H_2SiO_3 \cdot SO_2 + NaOH \rightarrow NaHSO_3 + H_2SiO_3 \cdot H_2O$$

The product resulting from the above reactions is dry, solid, semi-granular in nature and is ready to be processed for the recovery of its contents of sulfur dioxide. In order to recover the sulfur dioxide content and to prevent the formation of either ferric iron or sulfate sulfur during the recovery, the reaction product is heated for decomposition of the sulfite salts in an atmosphere excluding oxygen, or essentially so. This is readily accomplished by maintaining a sulfur dioxide gas blanket over the salt being heated. By excluding oxygen by means of the sulfur dioxide blanket over the sulfite salt product during its heat decomposition for recovery of the sulfur oxide content thereof, the sulfur dioxide-free residue obtained, in the case of the presence of a predominance of iron oxide for example, contains iron in the ferrous state rather than in the ferric state and the oxide in physical combination with highly adsorbent meta-silicic acid when is highly acid reactive, highly adsorbent and is suitable for re-use as the oxidic-siliceous material for entrapment of an additional moiety of sulfur dioxide gas by the process disclosed herein.

The heat decomposition of the reaction product is preferably carried out by heating the reaction product to a temperature of 205° C. to 350° C., but sometimes it is necessary to carry the temperature as high as approximately 400° C. in order to ensure decomposition of all sulfite salts in the reaction product. For example, the product can be directly heated, or in a preferred mode, the product can be heated in the general absence of oxygen such as by heating the product under a blanket of sulfur dioxide. After complete stripping it is found that the granulate is free or nearly free of sulfur dioxide and is suitable for reuse in the entrapment of additional sulfur dioxide in the same manner as disclosed herein and it is not necessary to add anything thereto other than the prescribed three to five percent by weight of water.

In order to achieve the maximum degree of reactability of the sulfur dioxide gas with the slag system containing the alkali hydroxide, alkali silicates and stannite ions the water content of the system must be kept within the prescribed range which can be easily accomplished by injecting water as required directly into the system during $SO_2$ gas processing. A further benefit of the inclusion of the additives disclosed herein is evidenced in the step wherein the granular product is heated to effect heat decomposition of the sulfite salts and the liberation of the sulfur dioxide. This benefit arises through the combined effects of the chemical and physical capabilities of the alkali hydroxide, hydrated alkali silicate, the stannous compounds and the alkali silicates formed so that the capability of hydrated metallic oxides to attach hydroxyl groups of water to produce reactable hydrogen is greatly reduced due to the fact that very minor amounts at the very most of uncombined water will ever be present at any one time partially because of the absorbent capacity for water exerted by the sodium silicate and the presence of the alkali hydroxide and stannite ions present. Consequently during the heat stripping of $SO_2$ in the absence of atmospheric oxygen no appreciable degree of oxidation can occur within the system under such heat processing.

As a corollary of the inhibition repression or restriction of oxidation through the use of the prescribed additives there occurs a similar inhibition, repression or restriction of reduction. This is reflected by the fact that the formation of elemental sulfur is kept to an absolute minimum.

EXAMPLE I 1 lb. of pulverized copper slag (90% 200 mesh U.S. sieve size) was intimately combined mechanically with 50 grams of an aqueous solution of sodium hydroxide containing 25 grams NaOH and .5 gram of stannous chloride ($SnCl_2$) both previously dissolved in 25 ml. of water. Gas having a composition by weight of 40% $SO_2$, 50% nitrogen and 10% air was injected into the slag mixture at the rate of 5 grams of gas per minute while the slag and entering gas were kept constantly agitated. During time intervals of approximately every 5 minutes approximately 5 mls. of water, in liquid form were added and mechanically mixed with the mixture being gassed. After a time period of 24 minutes of gassing no additional water was added but gassing was continued for another 5 minute time period after which the resultant product was weighed to show a weight of 544 grams. Analysis of a representative portion of product shows it contained 10.85% $SO_2$ illustrating the slag mixture had reacted with 98.34% of the sulfur dioxide gas contained in the gas mixture brought into contact with it in the described process. 100 grams of this product was externally heated for a time period of 15 minutes at a temperature of 750° F. (approximately 400° C.) to effect liberation of its content of $SO_2$. As the $SO_2$ was liberated it was removed by inert gas displacement into a slightly acidified aqueous solution containing a known excess of $KIO_3$ for the singular purpose of determining the amount of $SO_2$ liberated as determined by its chemical reaction with the $KIO_3$ solution. The amount shown to have been liberated calculated to 100% $SO_2$ amounted to 10.10 grams illustrating that 93.13% of the sulfur dioxide content of the product prepared from use of the entrapment portion of this process was recoverable.

EXAMPLE II

An additional 300 grams of the product prepared in Example I above was freed of its content of heat decomposible $SO_2$ by likewise heating to 750° F. (approximately 400° C.) in the same manner as above in Example I. After the $SO_2$ gas was stripped off the mixture was cooled and then combined with 15 mls. of water. Sulfur dioxide gas (99.5% $SO_2$) was injected into the mixture while it was constantly agitated and additional amounts of water 2 to 4 mls. were added from time to time during the gassing to assure a minimum water content as prescribed for the process (3 to 5% by weight based upon the total weight of the system being gassed). The relatively pure sulfur dioxide gas was introduced at the rate of aproximately 2 to 3 grams per minute until an excess of gas had been injected into the system as noted by its odor above the mixing vessel. The resultant product on analysis showed a sulfur dioxide content of 33.19% as $SO_2$ of which 94.11% was recovered by heat decomposition processing as before.

EXAMPLE III

The residue obtained after stripping the mixture of Example II was subjected to recycling three additional times to the $SO_2$ entrapment followed by the $SO_2$ heat stripping cycles. Only water was added between cycles or from time to time during cycles to keep the water content within acceptable limits. No other additives were used between cycles. Study of the product after each individual cycle confirmed the validity of the regeneratability of the $SO_2$ stripped residue for reuse in repetitious processing for entrapment and recovery of $SO_2$ gas.

It is not possible to totally eliminate oxidation-reduction reactions within the system. Hence the system does not have idefinite reusability. However, the introduction of alkali hydroxide or hydrated alkali silicate and stannite ions into the slag-water system has been found to materially extend the life of such a system over the life of any system not containing such additives as hereindescribed.

If economics are not of prime importance and a somewhat higher cost entrapment agency is permissible or, if the $SO_2$ impregnated product is to be used for purposes other than the recovery of its $SO_2$ content followed by reuse of the stripped product for further entrapment, for example if the resultant product is to be prepared for use in agriculture as a source material of a high content of oxidized sulfur for amending soils, or additionally, when the entrapment process can be or is carried out at a temperature below 100° C., it is possible to introduce amounts of alkali hydroxide or alkali silicate in excess of the aforenoted amounts. With the use of larger amounts of sodium hydroxide or alkali silicate it is possible to trap larger amounts of sulfur dioxide. For example, when a slag system was made to contain 10% sodium hydroxide and was then treated with sulfur dioxide gas in the same manner using the same amount as was used in the treatment of a slag system containing 5% sodium hydroxide and where all other conditions of processing were kept as nearly identical as possible, the system containing the 10% sodium hydroxide was able to hold 40% of its total weight in sulfur dioxide whereas the system containing the 5% NOH was able to hold only 30% of its total weight in sulfur dioxide. Thus with the use of this process where larger amounts of sodium hydroxide or sodium meta- or ortho-silicate are introduced it has been noted that the resultant product will contain larger amounts of $SO_2$ in proportion to the increased amounts of alkali hydroxide or silicate introduced. This result can be explained by the stoichiometric relationship of the system

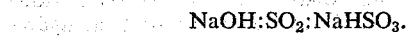

$NaOH:SO_2:NaHSO_3$.

When a higher content of alkali ion is introduced the system is capable of reacting with more $SO_2$ because one pound of NaOH reacts with 1.6 pounds of $SO_2$ to form 1 mol of sodium acid sulfite ($NaHSO_3$).

The foregoing is considered as illustrative only of the principles of the invention. Further, since numerous modifications and changes will readily occur to those skilled in the art, it is not desired to limit the invention to the exact method, operation and product shown and described, and accordingly all suitable modifications and equivalents may be resorted to, falling within the scope of the invention.

What is claimed as new is as follows:

1. A dry process for the entrapment and recovery of sulfur dioxide gas which comprises the steps of:
   (a) establishing a physical system comprising as essential components, a major portion of particulate waste slag from the reverberatory refining of copper pyritic ore and a minor portion of an oxidation inhibiting additive in amounts sufficient to partially suppress the formation of sulfate sulfur and ferric iron comprising an aqueous solution of (i) either an alkali hydroxide or alkali silicate and (ii) trace amounts of dissolved stannite ions ($SnO_2^=$);
   (b) contacting said physical system with a waste stack gas containing sulfur dioxide at a temperature below about 100° C.; and
   (c) recovering the dry particulate product comprising metallic sulfite salts, meta-silicic acid, adsorbed sulfur dioxide, and unreacted oxidic and siliceous matter.

2. The process of claim 1 including the steps of:
(d) heating the dry particulate product in the general absence of oxygen to a temperature in the range of about 205° C. to about 400° C. to effect decomposition of the sulfite salts and release of adsorbed sulfur dioxide thereby recovering the entrapped sulfur dioxide; and
(e) recovering the particulate residue remaining after step (d) for the entrapment of an additional moiety of sulfur dioxide.

3. The process of claim 2 wherein the heat of step (d) is carried out with a sulfur dioxide blanket over the dry particulate product.

4. A dry process for the entrapment of sulfur dioxide gas which comprises passing an $SO_2$ containing gas into a bed formed by admixing 3–5 parts water, 2–5 parts alkali hydroxide or alkali silicate, and 0.01–0.1 part stannous chloride or stanous oxide together with a sufficient quantity of mixed metallic oxides and metallic silicates selected essentially from the oxides and silicates of ferrous iron, calcium, magnesium and aluminum to make up 100 parts by weight at a temperature below about 100° C. so as to produce a dry particulate product comprising metallic sulfite salts, meta-silicic acid, adsorbed sulfur dioxide and unreacted oxidic and siliceous matter.

5. The process of claim 4 wherein said mixed metallic oxides and metallic silicates consist of waste slag from the reverberatory refining of copper pyritic ore.

6. The process of claim 4 wherein said mixed metallic oxides and metallic silicates comprise approximately 32 to 38 percent silicon dioxide present as mixed silicates of iron, calcium, magnesium, and aluminum; 28 to 32 percent iron, present predominantly as ferrous oxide and ferrous silicates; 8 to 10 percent calcium oxide, present as silicate; 6 to 8 percent aluminum oxide, present as silicate; 0.1 to 0.5 percent copper, present as metal and oxide; 0 to 0.5 percent lead, present as metal; and 0 to 1 percent sulfur, present in sulfide form.

7. The process of claim 4 wherein the recovered dry particulate product is heated in the general absence of oxygen to a temperature within the range of about 205° C. to about 400° C. to effect decomposition of the sulfite salts and release of adsorbed sulfur dioxide and thereafter recovering the particulate residue for the entrapment of an additional moiety of sulfur dioxide.

8. The process of claim 7 wherein the heating is carried out with a sulfur dioxide blanket over the dry particulate product.

9. The process of claim 4 wherein said mixed metallic oxides and metallic silicates consist of slag from the refining of copper pyritic ore, said slag including a substantial content of ferrous iron.

References Cited
UNITED STATES PATENTS

| | | | |
|---|---|---|---|
| 1,335,458 | 3/1920 | Patrick et al. | |
| 3,363,401 | 1/1968 | Pierre et al. | |
| 3,454,354 | 7/1969 | Kerr. | |
| 3,454,356 | 7/1969 | Raman. | |
| 3,475,121 | 10/1969 | Thornton. | |
| 3,492,083 | 1/1970 | Lowicki et al. | |
| 1,744,735 | 1/1930 | Berl | 252—461 |
| 2,927,851 | 3/1960 | Wilson | 71—32 |
| 3,547,583 | 12/1970 | Wilson | 423—242 |
| 3,669,617 | 6/1972 | Lowicki et al. | 423—244 |
| 3,720,754 | 3/1973 | Wilson | 423—244 |

OSCAR R. VERTIZ, Primary Examiner

G. HELLER, Assistant Examiner